United States Patent [19]

Blücher et al.

[11] Patent Number: 4,510,193

[45] Date of Patent: Apr. 9, 1985

[54] FILTER SHEET MATERIAL

[76] Inventors: Hubert Blücher, Freytagstrasse 45; Hasso von Blücher, Sohnstrasse 58, both of D-4000 Düsseldorf; Ernest de Ruiter, Höhenstrasse 57a, D-5090 Leverkusen 3, all of Fed. Rep. of Germany

[21] Appl. No.: 496,742

[22] Filed: May 20, 1983

[30] Foreign Application Priority Data

Feb. 9, 1983 [DE] Fed. Rep. of Germany ....... 3304349

[51] Int. Cl.$^3$ .......................... B32B 3/16; B32B 27/14
[52] U.S. Cl. ..................................... 428/196; 428/198; 428/215; 428/244; 428/290; 428/341; 428/911
[58] Field of Search ............... 428/196, 198, 144, 244, 428/215, 290, 341, 911

[56] References Cited

U.S. PATENT DOCUMENTS

| | | | |
|---|---|---|---|
| 3,039,172 | 6/1962 | Egan | 428/244 |
| 3,682,738 | 8/1972 | Smith | 428/196 X |
| 4,099,342 | 7/1978 | Singh | 428/244 X |
| 4,235,027 | 11/1980 | Singh | 428/290 |
| 4,267,221 | 5/1981 | Ishikawa | 428/144 X |
| 4,397,907 | 8/1983 | Rosser et al. | 428/244 X |

*Primary Examiner*—Thomas J. Herbert
*Attorney, Agent, or Firm*—Sprung Horn Kramer & Woods

[57] ABSTRACT

A filter sheet material consisting of an air-permeable, pliable, especially textile support which is covered only partially with a uniformly distributed adhesive on which adsorber particles, especially active carbon beads, are fixed and the use of such filter materials containing active carbon as adsorbent for protective suits.

16 Claims, No Drawings

FILTER SHEET MATERIAL

BACKGROUND OF THE INVENTION

The use of adsorbents is recommended whenever particular substances are to be removed from a mixture. Among the adsorbents, active carbon enjoys a special position which can be attributed to its high adsorption capacity due to its very great internal surface and its relatively unspecific adsorption, i.e., its physical adsorption. Furthermore, active carbon can be adapted to a particular application through the selection of its source material and the manner in which it is activated.

One important application of active carbon is in pliable filter sheet materials which are used in industry, in the household, but particularly in protective clothing. They consist usually of a support, which is often a textile material, on which a mixture of binding agent and adsorbent is applied by immersing it and squeezing out the excess. The binder is the cause of a reduction of the adsorption capacity, and in the case of textile materials, it always causes unwanted alterations in the pliability of the fabric due to cementing of the threads, which is a handicap especially in connection with garments (protective clothing).

The invention is addressed to the problem of creating filter sheet materials from an air-permeable, pliable, especially textile, support material, and an adsorbent fixed thereon, in which the special selection of the adsorber particles and their anchoring on the support material will be such as to assure not only optimum adsorption properties, but also high pliancy, good resistance to rub-off, and high air-permeability.

The quantity of the adsorber particles is to be uniformly distributed so as to achieve a uniform filtering action with a minimum of stray and accordingly good protective action combined with minimum rub-off. Moreover, the improved filter material is to be non-bulky, and must be washable without quality losses.

BRIEF DESCRIPTION OF THE INVENTION

These manifold requirements are satisfied in accordance with the invention by covering the support material only partially in a uniform distribution with an adhesive on which the adsorber particles are fixed. The term, "uniform distribution," as used herein, is to be understood to mean a statistically largely uniform distribution of the adhesive and hence also of the adsorber fixed thereon, on the surface of the support material. Preferably, the applied adhesive should cover only 20 to 80%, especially 30 to 70%, of the surface of the support material. This partial application of the adhesive, which thus decidedly differs from a continuous coating, can be achieved by applying the adhesive only to the prominences of a fabric serving as textile support material. Another possibility for a uniform distribution of the adhesive consists in printing it on in a particular pattern. This printed pattern can be in the form of dots or lines. By the choice of the pattern it is possible to create the geometry which is important to the absorption, and the percentage of unprinted area which determines the material's permeability to air. The amount of adhesive applied is constant and uniform over the entire width of the goods, within a few percent. The pattern of the adhesive applied in any particular way advantageously has a thickness of 0.05 to 0.5 mm and a diameter or width of 0.1 to 5, preferably 0.2 to 1, millimeter. The adhesive is best applied in dot form and the dots of adhesive are of hemispherical or conical shape.

Known adsorbent materials serve for the purposes of the invention, such as for example silicic acid xerogels, metal oxides and hydroxides, especially aluminum oxide and hydroxide, molecular sieves, ion exchangers and active carbons of various provenance. It has been found that the grain size of the adsorbent is important: if it is too small, the adsorption capacity is also too small; if it is too great, the kinetics of the adsorption is unfavorable. Especially in the case of active carbon, a grain size of 0.1 to 1 mm, especially 0.2 to 0.4 mm, has proven to be a good compromise for many applications. However, provision must be made for good resistance to rub-off, which depends on the one hand on the anchoring of the adsorber particles and on the other hand on their strength and their shape. Depending on how they are manufactured, the particles are usually in the shape of small cylinders, blocks or beads. The bead or ball shape is preferred as a rule. The active carbon should have an internal surface of 600 to 1500 square meters per gram. The amount of adsorbent applied, especiallly active carbon, amounts to from 10 to 250 g/m$^2$, preferably 60 to 150 g/m$^2$.

The active carbon can be prepared in a known manner from suitable organic materials. A very useful active carbon is obtained, for example, from bitumen, if a dispersion of it is made by heating it above the softening point in a medium of limited miscibility with bitumen, such as water under pressure, then chilling the dispersion, and extracting the bitumen spheres thus made, by means of an appropriate solvent, oxidizing it with sulfuric acid, carbonizing it, and finally activating it. The bitumen used can be natural bitumen or a bitumen obtained from petroleum residues. Depending on the starting material, the melting point is raised by the injection of air, if desired, so that the bitumen can barely still be dispersed at 100° to 150° C. Bitumen of excessively high melting point can be diluted with coal tar so as to be dispersible into fine droplets in the above-mentioned temperature range. By chilling the droplets, bitumen beads are obtained, which are deposited, for example, on a moving screen and then extracted with a suitable solvent. For this a mixture of benzene and methanol is recommended, because the addition of methanol considerably increases the dissolving capacity of benzene. This extraction has a twofold purpose:
1. The dissolving out of components of low molecular weight raises the melting point and stickiness is reduced, which is important for the subsequent stages of the process.
2. A microporous structure is formed, which greatly facilitates the oxidation that follows.

The extraction is performed preferably in closed reactors at temperatures between 30° and 100° C. The extracted components can vary between 15 and 60% and amount, as a rule, to about 35%. After recovery of the solvent, the extracted components can be used for the thinning of the highly viscous bitumen that is put in.

The extracted bitumen beads are then impregnated with concentrated sulfuric acid to further increase the melting point and porosity, and gradually heated, especially in a fluidized bed, to 700° C. Up to about 350° C. a powerful oxidation takes place, with the release of sulfur dioxide, while in the higher temperature range it is principally carbon compounds containing oxygen, especially a great deal of carbon dioxide, that are removed. Weight loss due to oxidation and pyrolysis is between 5 and 20%, depending on the starting material. Then the carbonized carbon beads are activated in a conventional manner.

The activation is performed especially with steam in a fluidized bed at 800° to 900° C. Other known activation methods are applicable.

An alternative to sulfuric acid oxidation is oxidation in air at temperatures of 100° to 400° C., in which case the oxygen content can increase to more than 10%. This is followed by pyrolysis at 600° to 700° C.

An alternative to the preparation of carbonized carbon beads from bitumen is to atomize molten bitumen to the desired droplet size and to pass these droplets together with an inert gas through a zone heated at 800° to 1600° C. By this treatment first the outer layer of the droplets is carbonized, and then also the internal bitumen.

Another possibility for producing active carbon beads which are especially useful for the purposes of the invention consists of heating organic cation exchangers rapidly in a fluidized bed to 600° to 700° C., and then activating them with steam, for example. The organic cation exchangers, especially sulfonated styrene-divinylbenzene copolymers, should be in the H+ form. They can, however, also contain heavy metal ions, such as nickel ions, for example. The porosity present in the ion exchanger has a very desirable effect, while the sulfone groups have a carbonizing and oxidizing action. The strength of the adsorber beads is sufficient, although slightly lower than that of the material made from bitumen. The active carbon beads prepared from bitumen in the manner described have a hard shell and a slightly softer core. The internal surface amounts to about 600 to 1500 square meters per gram, with a relatively high proportion of mesopores (10 to $15 \times 10^{-10}$ m). In the scope of the above-stated aims, bead diameters of 0.1 to 1 mm were obtained, centering around 0.2 to 0.4 mm, but variant diameters are easily achievable. The resistance to rub-off is very high, due to the especially hard shell.

For special applications, the adsorber beads can be jacketed or encapsulated for protection against undesired external influences. This is done by enveloping them in a thin layer of a polymer that has a selective permeability for the substances to be adsorbed. It is possible, for example, to envelope active carbon particles in a skin of macromolecules by pretreating them with acrylate dispersions, e.g., Acronal 50 D and 27 D of BASF, this skin being permeable to chemical warfare agents, but not to adjuvants used in printing.

Another way of encapsulating adsorbent grains is to mix them in a two-component blower with polyamide powder of very uniform particle size, in a ratio of about 1:1, and hurling them through a tubular gas furnace against a chilled, mirror-chromed steel plate. The polyamide softened in the tubular furnace wraps itself about the adsorber particles in the air stream and solidifies thereon upon emergence from the flame tube in the cooled air stream. The adsorbent grains thus enveloped in polyamide are prevented from sticking together by striking the mirror-chromed steel plate which is chilled down to about −15° C. Other known processes for the microencapsulation of the adsorbent grains in a variety of inorganic or organic envelope materials can also be used.

In addition to the processes already described, the encapsulation of the carbon particles can be accomplished, for example, by continuously adding minute amounts of suitable latices, such as an acrylate dispersion, while keeping the carbon powder in constant movement. These latices then coagulate on the surface.

The thickness of the encapsulation coatings can be from the order of magnitude of the diameter of the macromolecules to the micrometer range. In any case, the thin encapsulation of the adsorber particles should have a selective permeability, so that they are permeable to the substances to be adsorbed, such as chemical warfare agents, but not to the adhesive, sweat, laundry detergents, oils and fats. This last is important when such filter sheet materials are used in the multi-layer building up of protective suits, so as to prevent inactivation by wearing for long periods while under severe bodily stress, so as to assure a high and long-lasting protection against poison gases etc.

The anchoring of the adsorber beads, especially the activated carbon beads prepared from butumen or ion exchangers containing sulfone or sulfonate groups in accordance with the invention, requires an adhesive which must have not only great mechanical strength and resilience but also a certain penetrating ability plus sufficient initial tackiness to hold the adsorber particles sprinkled thereon in place until it achieves its strength. For the purposes of the invention, a very great variety of polymeric binding compounds can be used, such as polyurethanes, polyacrylates or elastomers, for example. These can also be halogenated, especially chlorinated or fluorinated. Also very appropriate are hot melt adhesives on the basis of polyamides, polyesters or ethylene-vinyl acetate copolymers (EVA). During printing the polymeric binding agents and the hot melt adhesives are usually in the form of a dispersion. In the printed pattern, however, all that will remain is the polymeric, solidified, crosslinked or vulcanized binding agent. Also very suitable are solvent-free polyurethane systems, such as those marketed under the name, "High-Solids" (BAYER).

According to a preferred embodiment of the invention, flameproofing agents are admixed with the adhesive. These, if properly selected, make the entire filter fire-retardant. Preferred flameproofing agents are those on the basis of antimony trioxide in combination with bromine compounds. These act as radical traps in the gas phase and thus have a certain spacing action. Since in the filter of the invention, these flameproofing agents are added to adhesives applied in line or point form to hold the adsorbents, there is no substantial change in the feel of the textile support. This type of flameproofing obviates the need for additional impregnation of the web of support material.

Lastly, the addition of blowing agents to the adhesive results in the formation of small domes covered with adsorbers, which are advantageous for the dynamic behavior of gases. Especially in the case of the use of High Solids, the blowing agent by the production of foam additionally prevents excessive penetration or sagging of the adhesive into the support just before crosslinking occurs.

The support imprinted with adhesive and additives is, in accordance with the invention, spread with the adsorbers over its entire surface, and the excess that does not adhere is removed. Then the material is placed in a tension frame or heating duct to set the adhesive. The pliable filter material thus obtained has an excellent permeability to air, very good resistance to rub-off, and a high filtering performance. Its resistance to rub-off satisfies ordinary requirements; if necessary, it can be further improved by thermally bonding a textile material imprinted with dots of hot melt adhesive directly onto the adsorbers without thereby impairing the adsorption performance.

The high air permeability and the resultant high permeability to water vapor of the filter material of the invention makes it especially suitable for protective suits in which the removal of body heat is an additional important requirement.

A further increase of effectiveness can be achieved by adding encapsulated enzymes to the adsorbers. To preserve the gel, the protective membrane must prevent the evaporation of moisture, yet be permeable to the substances to be destroyed (e.g., chemical warfare agents). It is also possible to add to the gel moisture attracting substances which are compatible with the enzyme, so that the gel will be in equilibrium with atmospheric humidity.

Enzymes which decompose mustard gas and nerve poisons are already available in encapsulated form. A filter sheet material which has both adsorbents and suitable enzymes is especially appropriate for protection against chemical warfare agents, since in them a kind of self-detoxification takes place. The adsorbents cannot be dispensed with because they operate as an intermediate stage, and in this case it is important that the mesopore system be well constructed for the purpose of rapid adsorption, but also for release to the enzyme.

Everything that has been said about the manner in which the adsorber particles are applied can also be said about the encapsulated enzymes. Here, too, the application of a discontinuous layer of adhesive followed by sprinkling with the encapsulated gel droplets is the most advantageous fixing method, for the support remains pliable and the enzyme is easily accessible. Care must be taken, of course, to see that no components of the adhesive damage the membranes or the enzyme itself and to avoid the application of elevated temperatures. In practice, it is possible, for example, first to apply the adsorbent in the manner described, and then to use the still-untreated side of the support for fixing the encapsulated gel spheres containing the enzyme.

EXAMPLES OF PREFERRED EMBODIMENTS

EXAMPLE 1

Preparation of Adsorber Beads

Bitumen from a petroleum distillation residue, with a softening point around 120° C., was dispersed under pressure in water at 160° C., chilled to 15° C., and the beads thus obtained were separated from the water on a sieve belt. The elemental analysis (Waf) was:
C: 91.7%
H: 4.2%
N: 1.2%
S: 0.8%
O: 2.1%

Then the beads were extracted at 70° C. in a 2:1 mixture of benzene and methanol. The extraction loss amounted to 36%. The residue felt dry to the touch and at 250° C. still showed no appreciable softening.

The elemental analysis (Waf) was:
C: 91.2%
H: 3.7%
N: 1.3%
S: 0.7%
O: 3.1%

The extracted beads were then heated in air with occasional stirring up (4 hours at 250° C., 1 hour at 340° C.). No change in appearance was noted; the weight increase amounted to 2.6%.

The elemental analysis was:
C: 85.2%
H: 2.6%
N: 1.2%
S: 0.8%
O: 10.2%

In the subsequent carbonization (temperature increased to 700° C.) a weight loss of 22.6% occurred.

The elemental analysis was:
C: 96.6%
H: 0.4%
N: 1.2%
S: 0.6%
O: 1.2%

The activation was performed with steam at 820° C. in a fluid bed. Weight loss 12%. The BET surface area was 730 m$^2$/g.

EXAMPLE 2

Preparation of the Flexible Filter

A cotton fabric of 90 g/m$^2$ was dot-printed by means of a 14-mesh stencil with a paste of 100 parts of prepolymerized, masked isocyanate (Impranil 43034), 3.5 parts of Sb$_2$O$_3$, 6.5 parts of decabromodiphenyl ether, 2 parts of silica with an internal surface area of 380 BET, and 13.5 parts of an aromatic triamine as crosslinking agent for the isocyanate (Impranil 43035). The rate of application amounted to about 20 grams per square meter.

The web of goods emerging from the printing mechanism was sprinkled with adsorber beads from Example 1, the excess was removed and the adhesive was crosslinked. 120 to 140 grams of adsorber beads per square meter of support were anchored so as to resist rub-off. The flexible filter material thus obtained had a permeability to air of 900 l/m$^2$/sec at 10 mm of water column. Its filtration performance against mustard gas and nerve poisons exceeded requirements.

EXAMPLE 3

A filter fabric manufactured as in Example 2 was printed on the untreated side with the dispersion of a self-crosslinking acrylate, using the same printing apparatus (18 grams per sq. meter), sprinkled with encapsulated enzymes (diam. 0.1 to 0.2 mm), and, after removal of the excess, dried at 30° C. In this manner 30 g of gel beads containing enzyme was applied.

It will be understood that the specification and examples are illustrative but not limitative of the present invention and that other embodiments within the spirit and scope of the invention will suggest themselves to those skilled in the art.

We claim:

1. A filter sheet material comprising an air-permeable textile material, an adhesive uniformly covering about 20 to 80% of the surface of the textile, the applied adhesive having a height of about 0.05 to 0.5 mm and a diameter or width of about 0.1 to 5 mm, and about 10 to 250 g/m$^2$ of activated carbon adsorber particles anchored to the textile by the adhesive, the carbon particles having an internal surface of at least about 600 m$^2$/g and a diameter of at least about 0.1 mm.

2. A filter sheet material according to claim 1, wherein the adhesive is polyurethane and is cross-linked after anchoring of the carbon particles.

3. A filter sheet material according to claim 1, wherein the adhesive is applied only to the fabric prominences.

4. A filter sheet material according to claim 1, wherein the adhesive is printed onto the support material.

5. A filter sheet material according to claim 1, wherein the adhesive is in dot form, the dots of adhesive having the shape of a hemisphere or the form of a cone.

6. A filter sheet material according to claim 1, wherein the adsorber beads are jacketed in a material that is permeable to chemical warfare agents and which protects the adsorbent agent against external influences.

7. A filter sheet material according to claim 1, including a flameproofing agent within the adhesive and thereby making entire filter sheet material resistant to flame.

8. A filter sheet material according to claim 1, including a blowing agent within the adhesive.

9. A filter sheet material according to claim 1, including encapsulated enzymes affixed on the applied adhesive.

10. A filter sheet material according to claim 1, including encapsulated enzymes adhered by an adhesive to the other side of the pliable support.

11. A protective garment formed at least in part of a filter sheet material in accordance with claim 1.

12. A filter sheet material according to claim 1, wherein the adsorber particles are active carbon beads of an internal surface of about 600 to 1500 $m^2/g$ and have a diameter of about 0.1 to 1 mm.

13. A filter sheet material according to claim 12, wherein the active carbon beads are obtained by heating an organic cation ion exchanger.

14. A filter sheet material according to claim 12, wherein the active carbon beads are made from bitumen.

15. A filter sheet material according to claim 14, wherein the bitumen is dispersed above its melting point in a liquid which is immiscible or only poorly miscible therewith, and then chilled, whereupon bitumen beads separate from the liquid, the beads are extracted with solvent for the removal of sticky components, impregnated with sulfuric acid, heated to at least 600° C. to produce carbonized carbon beads, and then activating the beads in known manner.

16. A filter sheet material according to claim 14, wherein molten bitumen is sprayed in an inert gas to form droplets and heated at about 800° to 1600° C., whereupon carbonized carbon beads are obtained, and the beads are then activated in known manner.

* * * * *

REEXAMINATION CERTIFICATE (1147th)
United States Patent [19]
Blücher et al.

[11] B1 4,510,193
[45] Certificate Issued  Oct. 24, 1989

[54] FILTER SHEET MATERIAL

[76] Inventors: Hubert Blücher, Freytagstrasse 45; Hasso von Blücher, Sohnstrasse 58, both of, D-4000 Düsseldorf; Ernest de Ruiter, Höhenstrasse 57a, D-5090 Leverkusen 3, all of Fed. Rep. of Germany

Reexamination Request:
No. 90/001,730, Mar. 13, 1989

Reexamination Certificate for:
Patent No.: 4,510,193
Issued: Apr. 9, 1985
Appl. No.: 496,742
Filed: May 20, 1983

[30] Foreign Application Priority Data

Feb. 9, 1983 [DE] Fed. Rep. of Germany ....... 3304349

[51] Int. Cl.$^4$ ............ B32B 3/16; B32B 27/14
[52] U.S. Cl. .................... 428/196; 428/198; 428/215; 428/244; 428/290; 428/341; 428/911
[58] Field of Search ......... 428/196, 198, 144, 244, 428/215, 290, 341, 911

[56] References Cited

FOREIGN PATENT DOCUMENTS 2067095  7/1981  United Kingdom .
2077141 12/1981  United Kingdom .

*Primary Examiner*—T. J. Herbert, Jr.

[57] ABSTRACT

A filter sheet material consisting of an air-permeable, pliable, especially textile support which is covered only partially with a uniformly distributed adhesive on which adsorber particles, especially active carbon beads, are fixed and the use of such filter materials containing active carbon as adsorbent for protective suits.

REEXAMINATION CERTIFICATE ISSUED UNDER 35 U.S.C. 307

THE PATENT IS HEREBY AMENDED AS INDICATED BELOW:

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claim 1 is determined to be patentable as amended.

Claims 3-15 and 16, dependent on an amended claim, are determined to be patentable.

1. A filter sheet material comprising an air-permeable textile material, an adhesive uniformly covering about 20 to 80% of the surface of the textile, the applied adhesive having a height of about 0.05 to 0.5 mm and a diameter or width of about 0.1 to 5 mm, and about 10 to 250 g/m$^2$ of activated carbon adsorber particles anchored to the textile by the adhesive, the carbon particles having an internal surface of at least about 600 m$^2$/g and a diameter of at least about 0.1 mm, *the adhesive being a masked isocyanate prepolymer which is crosslinked to form a polyurethane by means of a crosslinking agent for the isocyanate after spreading the carbon particles on the textile material with the applied adhesive.*

* * * * *